350-371 SR

XR 3,184,539

X 4045T

X 4034W

May 18, 1965 F. J. THOMAS 3,184,539

VISUAL DISPLAY DEVICE FOR PRESENTATION OF CONTINUOUS VIDEO DATA

Filed Feb. 2, 1961 3 Sheets-Sheet 1

INVENTOR

Francis J. Thomas

3184539
OR IN 358/56

United States Patent Office 3,184,539
Patented May 18, 1965

3,184,539
VISUAL DISPLAY DEVICE FOR PRESENTATION OF CONTINUOUS VIDEO DATA

Francis J. Thomas, Briarcliff Manor, N.Y., assignor to International Business Machines Corporation, New York, N.Y., a corporation of New York Filed Feb. 2, 1961, Ser. No. 86,608
8 Claims. (Cl. 178—5.4)

This invention relates to visual display devices and, in particular, to devices wherein the presentation is comprised of a group of adjacent lines (or strips) of visual information.

A cathode ray tube is a common display device that is adaptable for the presentation of a visual display comprised of adjacent lines of visual (video) data. These tubes are in common use as the display device for television receivers. A cathode ray tube requires an elaborate and expensive electron gun (particularly if a color presentation is to be displayed), relatively high supply voltages and an elaborate deflection system (including an ion trap in some cases). In addition, cathode ray tubes are inherently lengthy in size and in many applications, including conventional television receivers, are the limiting factor in any effort to reduce the depth of the cabinet in which they are mounted.

Several display devices have been suggested as substitutes for cathode ray tubes to overcome these disadvantages. The display areas of these devices are discretely scanned in two directions using various techniques, all of which are complicated and require the use of relatively high frequency circuits and components. For example, in a conventional television receiver, 525 individual lines of information are presented thirty times each second. A display that is 24 inches wide comprising discrete segments along a line that are each one-eighth of an inch apart requires that the discrete segments be sequentially controlled at a rate of approximately three megacycles. This requirement alone presents an imposing problem.

An object of the present invention is to achieve a display device which provides a visual presentation that is comprised of a group of adjacent lines of continuous (not discrete) video data.

Another object is to show a method and apparatus for presenting a visual display comprised of adjacent lines of video data wherein an entire line of data is simultaneously presented.

A further object is to show a visual display device that is relatively shallow in depth with a shape similar to that of a picture.

Another object is to teach the use of optical sonic delay lines in a display device.

A still further object is to show a display device for a black and white television receiver.

Another object is to show a display device for a color television receiver.

These objects are accomplished by selectively modulating light from a source with video information. Two polarizers are oriented such that the passage of light from the source to a screen is inhibited. A group of photoelastic sonic delay lines, one for each line of the presentation, are positioned between the polarizers.

A photoelastic sonic delay line may consist of a relatively transparent solid such as quartz or fused silica or it may consist of a tube of liquid. The delay line is actuated by an electromechanical transducer, such as a piezo-electric crystal and the mechanical disturbances thus generated are passed through the line at a sonic speed. Photoelasticity (birefringence) is described in a text entitled Handbook of Physics, edited by E. V. Condon and Hugh Odishaw and published by McGraw-Hill, 1958, at pages 3—85 and 6—120.

One useful feature of a photoelastic delay line is its ability to rotate the polarization of light in the regions of mechanical disturbances.

In the present invention, each line of video data is serially applied to the transducer corresponding to the appropriate delay line to set up travelling mechanical disturbances which affect the polarization of light passing through the delay lines such that the polarizers no longer completely inhibit the light. The source of light for this system is strobed as the video data applied to a delay line has travelled the proper distance. In this manner an entire line of the resulting presentation is simultaneously displayed. The delay lines are sequentially operated (scanned) and an overall display comprised of adjacent lines of video data is presented. Scanning in the direction of the axes of the delay lines is obviously not required as each delay line automatically distributes a line of video data along its length.

The foregoing and other objects, features and advantages of the invention will be apparent from the following more particular description of preferred embodiments of the invention, as illustrated in the accompanying drawings.

Figure 1:
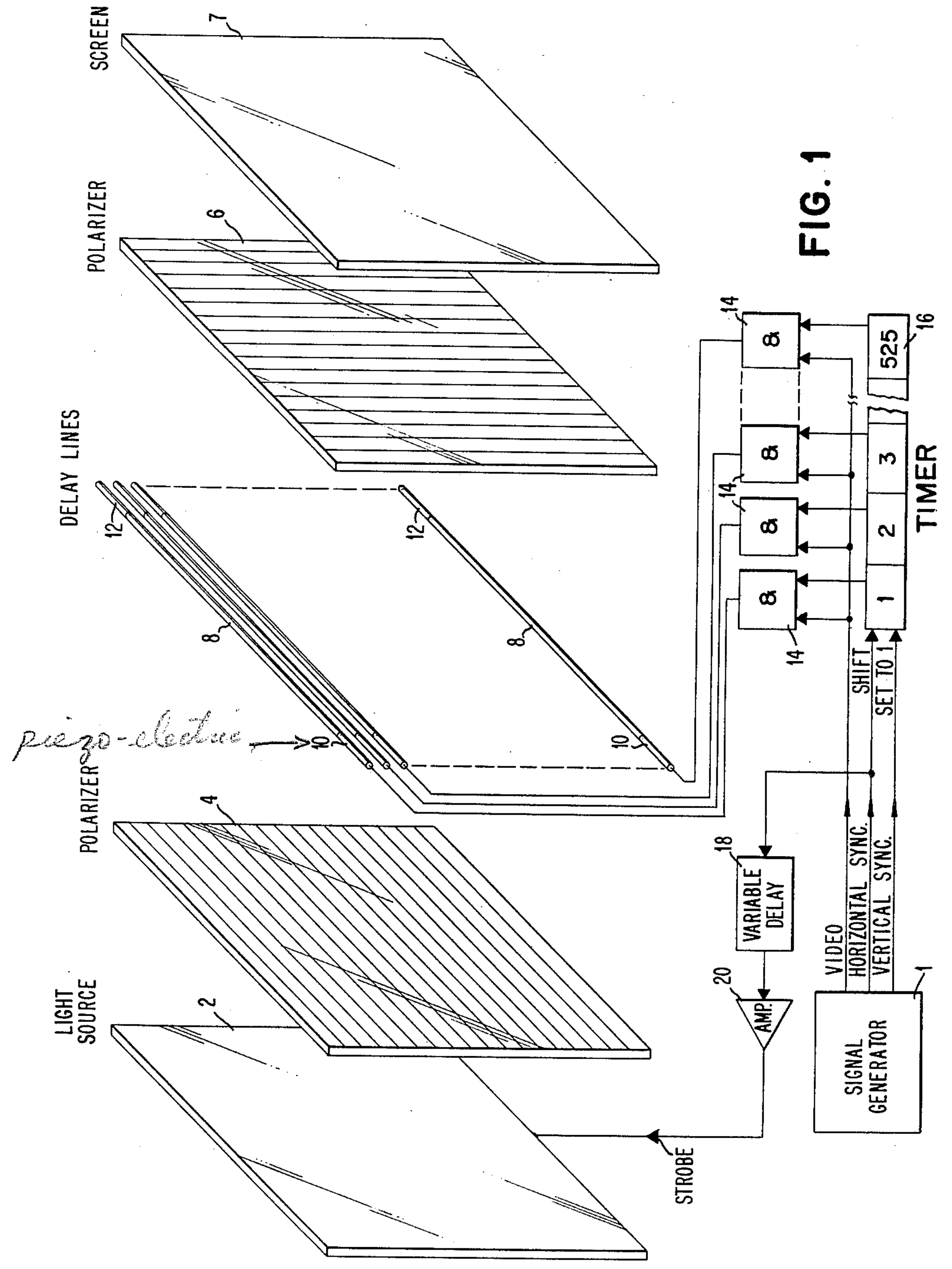
FIGURE 1 is a diagram of a display system for providing a black-white presentation.

The display device as shown in FIGURE 1 is embodied in a black-white television receiver. The video and sync signals are available in a conventional television receiver, making this invention fully compatible with conventional television equipment. For purpose of illustration a signal generator 1 is shown to provide these signals.

A light source 2 provides the source of illumination for the presentation. The light source may contain a group of gas discharge lamps located behind a frosted glass plate. Any light source that may be strobed at a frequency of 15,750 pulses per second is suitable. Two polarizers 4 and 6 are arrayed with their axes of polarization at right angles to ordinarily inhibit the passage of light to a screen 7. A group of sonic delay lines 8 are positioned between the polarizers. These lines are located adjacently such that the entire display area is essentially "covered" by delay lines. A transducer 10 is mechanically connected to one end of each delay line to convert the applied video signal into mechanical disturbances. The transducers may be piezo-electric crystals. The mechanical disturbances generated by the transducers travel along the delay lines. Each delay line is terminated with an energy-absorber 12 to prevent reflections of energy. The energy absorbers may be of any soft pliable material such as neoprene or rubber.

The mechanical disturbances present in the delay lines cause the applied light which has passed through the first polarizer 4 to be rotated in polarization and to be partially passed by the second polarizer 6. The intensity of the display is dependent upon the amount of rotation of the polarization of the light which, in turn, is dependent upon the amplitude of the applied video signal.

A horizontal sync signal that is synchronized with each line of the video signal is available in a conventional television receiver and is shown as an output of the signal generator 1. This sync signal is used to control the conditioning of the delay lines such that each successive line of video data is presented to a successive delay line. The input video signal is applied to a group of "and" gates 14 which function in combination with a timer 16 to sequentially apply the video signal to the selected transducer 10. In this embodiment, 525 "and" gates and delay lines and a 525 section timer is shown to provide a 525 line television presentation. The timer 16 provides an output conditioning signal from one section at a time, in sequence as the horizontal sync input pulses are applied. The vertical sync pulse is used to set the first section of the timer before each cycle of operation. The timer will be explained in detail with respect to FIG. 3 subsequently. An accurate electronic delay line with 525 outputs may be used to provide "and" gate conditioning signals. In this case, the vertical sync signal is used exclusively.

The horizontal sync pulse is applied through a delay 18 and an amplifier 20 to strobe the light source 2. The delay is variable to compensate for inherent circuit delays and for the time taken for a line of video data to travel to the correct position in the sonic delay line.

The width of the display is dependent upon the speed of travel of the vidio disturbances in the delay lines. The resulting display may be modified in size or shape by the use of lenses. An alternate method for altering the display size makes use of electronically-variable delay lines to compress or expand the video signal before application to the transducers.

Interlaced scanning could obviously be incorporated by scanning the odd-numbered lines in sequence, followed by the even numbered lines.

The light source 2, polarizers 4 and 6, and the light gates 8 are separated for simplicity of understanding, but may be located in close proximity such that the overall device is relatively thin with a shape similar to that of a picture.

Figure 2:
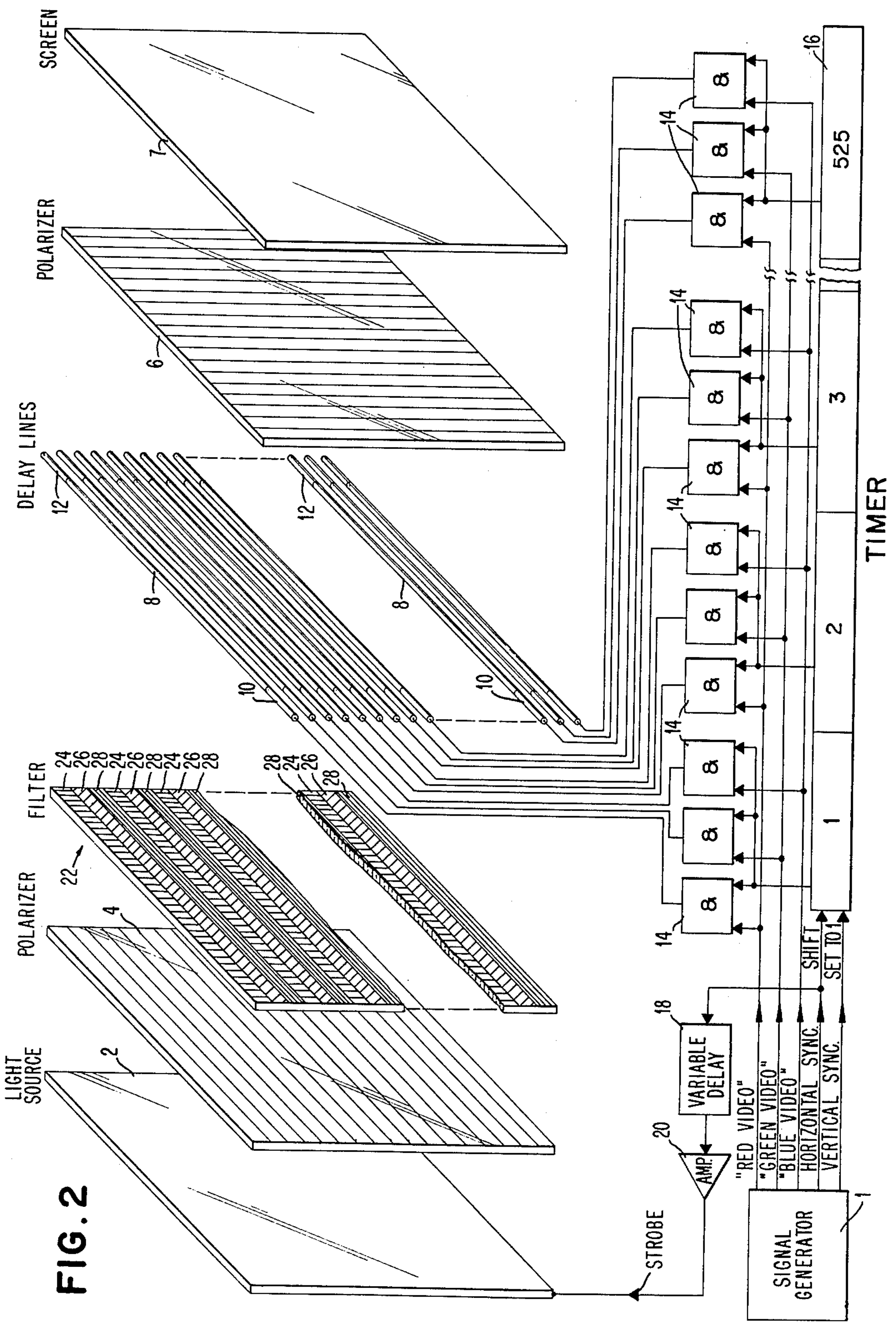
FIGURE 2 is a diagram of a display system for providing a color presentation.

The invention is embodied in a color television receiver in FIGURE 2. In place of the black-white video input signal required by the embodiment shown in FIGURE 1, three "colored" video signals are used which, when combined, produce the desired resultant color. These signals are readily obtainable in a conventional color television receiver and are shown as outputs of a signal generator 1. Three delay lines 8 and three "and" gates 14 are required for each line of video data. In the embodiments shown, there is one delay line 8 for "red" video, one for "green" video and one for "blue" video, for each of the 525 lines to be presented. A filter 22 is used in order to present light of the appropriate colors to the appropriate delay lines. The overall filter 22 is comprised of red filters 24, green filters 26, and blue filters 28, arranged in sequence behind the appropriate delay lines. The filters may be incorporated into the delay lines by coloring or coating the material from which they are constructed or the filters may be plated on any available surface such as the polarizer 4. In other respects, the color television receiver embodiment shown in FIGURE 2 is similar to the black-white receiver shown in FIGURE 1. The three delay lines for each line are placed in close proximity to cause the colors to blend together to produce the desired restulant colors on the screen 7. The screen may be corrugated to direct the light from the three delay lines corresponding to each line to a single line at the face of the screen.

The color television receiver shown and described with respect to FIGURE 2 will generate a black-white presentation if a black-white broadcast is received in the same manner that a conventional color television receiver operates.

Figure 3:
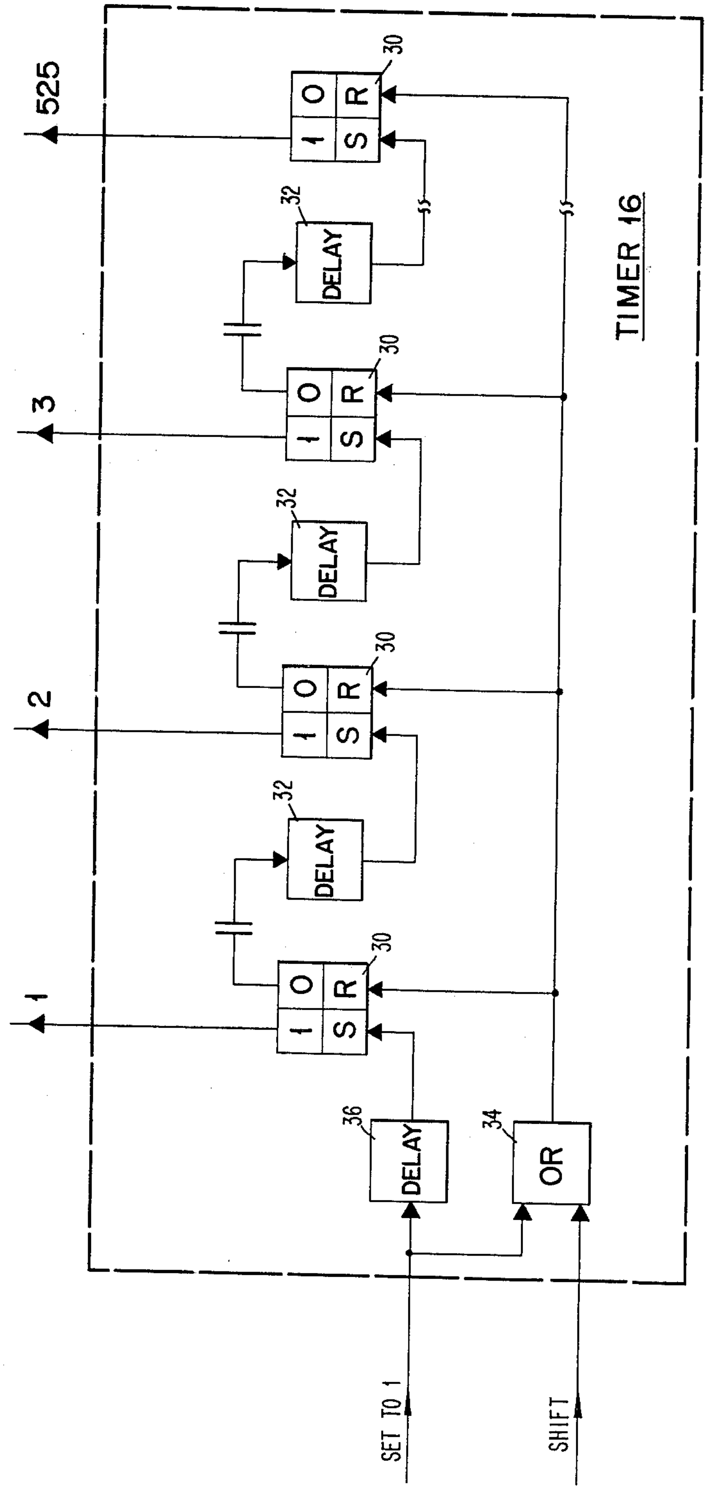
FIGURE 3 is a diagram of a timer that is suitable for use in the embodiments of FIGURES 1 and 2.

A timer 16, suitable for use in the embodiments shown in FIGURES 1 and 2 is shown in detail in FIGURE 3. It is comprised of a plurality of sections each containing a bistable device 30 and a delay 32. (The final stage requires no delay.) The bistable devices 30 are shown to have two inputs and two outputs. A signal to the set (S) input generates a "1" output; a signal to the reset (R) input generates a "0" output. A "set to 1" input is applied to the reset (R) inputs of all bistable devices 30 through an "or" gate 34. This signal is longer in duration than the delay time of delays 32 to insure that the "0" outputs of the bistable devices do not set the subsequent bistable devices after the termination of the "set to 1" signal. This signal is also applied through a delay 36 to set the first bistable device after all bistable devices have been reset. The input shift pulses are then applied. The first reset pulse resets only the first bistable device because all other bistable devices are already reset by the "set to 1" pulse. A "0" output is generated by the first bistable device and is applied through a delay 32 to set the second bistable device. The delay time of a delay 32 is greater than the duration of the reset pulse to insure that the newly-set bistable device is not immediately reset again. In the same manner, the succeeding bistable devices are set in sequence upon the application of succeeding shift pulses. The "0" output of the final bistable device may be delayed and applied to set the first bistable device. In this case, the timer "recycles" and the "set to 1" input is not needed once the timer has been synchronized. The "1" outputs of the bistable devices are used to condition the "and" gates 14 shown in FIGURES 1 and 2.

The visual display device has been shown and described in connection with black-white and color television receiver embodiments. This display device provides a presentation comprised of a group of adjacent lines of video data. An entire line of data is presented at one time. The display device requires line scanning signals only, because the delay lines inherently position the data along each line. Among other uses, this device is a suitable replacement for a cathode ray tube for many applications.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for converting an input signal indicative of lines of video data to be displayed into a light pattern containing adjacent lines of visual data comprising, in combination: a timing means; a light source for generating a path of light under control of the timing means; a transducing means having a plurality of outputs and responsive to the input signal and the timing means such that mechanical disturbances with amplitudes dependent upon the input signal are generated at the output that is determined by the timing means; a plurality of adjacently-positioned delay lines located within the path of light, each controlled by an output of the transducing means, for altering the polarization of the light passing through them in the regions of the mechanical disturbances that are generated by the transducing means, a first polarizer located in the path of the light beam on one side of the delay lines; and a second polarizer located in the path of light on the other side of the delay lines and oriented to block the passage of the light that is not altered by a mechanical disturbance in a delay line.

2. An apparatus for generating a line-by-line visual display from a time-varying electrical input signal whose instantaneous amplitude ins indiactive of the relative brightness of the display at a point on a line comprising, in combination: a timing means for sequentially generating a separate timing signal for each line of the display; a plurality of coincidence means, each responsive to the input signal and a timing signal from the timing means; a plurality of transducers, each responsive to the output of a coincidence means, for generating mechanical disturbances dependent upon the amplitude of the output of the coincidence means; a light source for generating a path of light under control of the timing means; a plurality of adjacently-located sonic delay lines positioned within the path of light, each mechanically connected to a transducer for altering the polarization of the light passing through them in the regions of the mechanical disturbances that are generated by the associated transducer means; a first polarizer located in the path of the light beam on one side of the delay lines; and a second polarizer located in the path of light on the other side of the delay lines and oriented to block the passage of the light that is not altered by a mechanical disturbance in a delay line.

3. A television receiver comprised in combination: signal generating means for generating a video signal representing lines of the presentation and for generating timing signals in timed relationship of the viedo signal; selecting means responsive to said signal generating means having an output for each line of the presentation, for routing the appropriate portions of the video signals to the appropriate outputs, a plurality of electromechanical transducers, each responsive to the output of said selecting means, for generating mechanical disturbances dependent upon the amplitude of the output of the selecting means; a light source for generating a path of light under control of a timing means; a plurality of adjacently located sonic delay lines positioned within the path of light, each mechanically connected to a transducer for altering the polarization of the light passing through them in the regions of the mechanical disturbances that are generated by the associated transducer means; a first polarizer located in the path of the light beam on one side of the delay lines; and a second polarizer located in the path of light on the other side of the delay lines and oriented to block the passage of the light that is not altered by a mechanical disturbance in a delay line.

4. An apparatus for producing a light pattern representative of input time-varying video data comprising, in combination: a strobable light source for producing light at a predetermined time-relationship with respect to the input data; polarization means oriented to ordinarily block the light from the light source; delay means responsive to the input data for selectively unblocking the light along portions of discrete linear regions, one region at a time in sequence, whereby a light pattern modulated in accordance with the input data is produced.

5. An apparatus for producing a two-dimensional light pattern representative of input time-varying video data comprising in combination: a strobable light source for producing light at a predetermined time-relationship with respect to the input data; polarization means oriented to ordinarily block the light from the light source; delay means responsive to the input data for selectively unblocking the light along portions of discrete linear regions, whereby a two-dimensional light pattern modulated in accordance with the input data is produced.

6. An apparatus for producing a two-dimensional light pattern, made up of a group of adjacent linear light patterns, representative of input time-varying video data comprising in combination: a strobable light source for producing light at a predetermined time-relationship with respect to the input data; first and second polarization means oriented to ordinarily block the light from the light source; a plurality of adjacently-located substantially rod-shaped delay means responsive to the input data, each for unblocking the light in selected regions along its length; whereby a two-dimensional light pattern modulated in accordance with the input data is produced.

7. An apparatus for generating a line-by-line visual display from a time-varying electrical input signal whose instantaneous amplitude is indicative of the relative brightness and color of the display at a point on a line comprising in combination: a timing means for sequentially generating a separate timing signal for each line of the display; a plurality of coincidence means, each responsive to an input signal and a timing signal from the timing means; a plurality of transducers, each responsive to the output of a coincidence means, for generating mechanical disturbances dependent upon the amplitude of the output of the coincidence means; a light source for generating a path of light under control of the timing means, a plurality of adjacently-located sonic delay lines positioned within the path of light, each mechanically connected to a transducer for altering polarization of the light passing through them in the regions of the mechanical disturbances that are generated by the associated transducer means; filter means, a first polarizer located in the path of the light beam on one side of the delay lines; and a second polarizer located in the path of light on the other side of the delay lines and oriented to block the passage of the light that is not altered by a mechanical disturbance in a delay line.

8. A television receiver comprised in combination: signal generating means for generating a plurality of video signals each containing intensity and color data for lines of the presentation and for generating timing signals in timed relationship to the video signals; selecting means responsive to said signal generating means having a plurality of outputs for each line of the presentation, one for each of said plurality of video signals for routing the appropriate portions of the video signals to the appropriate outputs; a plurality of electromechanical transducers, each responsive to an output of said selecting means, for generating mechanical disturbances dependent upon the amplitude of the output of the selecting means; a light source for generating a path of light under control of a timing means; a plurality of adjacently located sonic delay lines positioned within the path of light, each mechanically connected to a transducer for altering the polarization of the light passing through them in the regions of the mechanical disturbances that are generated by the associated transducer means; filter means; a first polarizer located in the path of the light beam on one side of the delay lines and a second polarizer located in the path of light on the other side of the delay lines and oriented to block the passage of the light that is not altered by a mechanical disturbance in a delay line.

References Cited by the Examiner

UNITED STATES PATENTS

| | | | |
|---|---|---|---|
| 2,509,545 | 5/50 | Walton | 178—7.3 |
| 2,670,402 | 2/54 | Marks | 178—6 |

DAVID G. REDINBAUGH, *Primary Examiner.*

NEWTON LOVEWELL, ROBERT SEGAL, *Examiners.*